United States Patent [19]

Yagi et al.

[11] Patent Number: 5,525,220
[45] Date of Patent: *Jun. 11, 1996

[54] FILTRATION EQUIPMENT

[75] Inventors: Masayoshi Yagi, Miyoshi-machi; Yoshio Sunaoka, Higashimatsuyama, both of Japan

[73] Assignee: Organo Corporation, Tokyo-to, Japan

[*] Notice: The term of this patent shall not extend beyond the expiration date of Pat. No. 5,484,528.

[21] Appl. No.: 343,149

[22] Filed: Nov. 22, 1994

[30] Foreign Application Priority Data

Dec. 22, 1993 [JP] Japan .................................. 5-325377

[51] Int. Cl.$^6$ ................................................ B01D 63/00
[52] U.S. Cl. ............................. 210/321.79; 210/321.8; 210/321.89; 210/456; 210/451; 210/232; 210/357; 96/10
[58] Field of Search ...................... 210/321.79, 321.8, 210/321.87, 321.89, 456, 500.23, 350, 357, 323.2, 232, 451; 96/10; 210/232, 451

[56] References Cited

U.S. PATENT DOCUMENTS

| | | | |
|---|---|---|---|
| 3,279,608 | 10/1966 | Soriente et al. | 210/323.2 |
| 3,615,016 | 10/1971 | Soriente et al. | 210/323.2 |
| 4,775,471 | 10/1988 | Nagi et al. | 210/323.2 |
| 4,876,006 | 10/1989 | Ohkubo et al. | 210/321.89 |
| 5,128,038 | 7/1992 | Slavitsch et al. | 210/323.2 |

FOREIGN PATENT DOCUMENTS

| | | | |
|---|---|---|---|
| 62-197106 | 8/1987 | Japan . | |
| 958330 | 9/1982 | U.S.S.R. | 210/323.2 |

OTHER PUBLICATIONS

Derwent Abstract, Dec. 6, 1994, File 351 2 pages, Laid Open No. 197,106/1987; "Filtering column—uses hollow yarn module opened at both ends and arranged vertically in middle chamber", Japan Organo KK.

*Primary Examiner*—Ana Fortuna
*Attorney, Agent, or Firm*—Sprung Horn Kramer & Woods

[57] ABSTRACT

A filter vessel is partitioned with a watertight partition to form a common upper filtrate collection compartment in the upper part of the filter vessel. A plurality of hollow fiber modules each having upper and lower filtrate outlet ports are vertically disposed in the filter vessel to communicate with the common upper filtrate collection compartment via the upper filtrate outlet ports thereof. The hollow fiber modules also communicate with a lower filtrate collection casing via the lower filtrate outlet ports thereof. At least one conduit is provided in the filter vessel to allow the lower filtrate collection casing to communicate therethrough with the common upper filtrate collection compartment. Feed water fed into the filter vessel is filtered through the walls of porous hollow fibers in the hollow fiber modules into the bores of the porous hollow fibers, through which the filtrate is conducted into the common upper filtrate collection compartment via the upper filtrate outlet ports of the hollow fiber modules as well as via the lower filtrate outlet ports of the hollow fiber modules, the lower filtrate collection casing and said at least one conduit. The filtrate collected in the common upper filtrate collection compartment is then discharged therefrom out of the filter column.

8 Claims, 6 Drawing Sheets

FILTRATION EQUIPMENT

BACKGROUND OF THE INVENTION

1. Field of the Invention

The present invention relates to filtration equipment using hollow fiber modules, which is used to filter fluids, or liquids, such as condensate water, obtained in a nuclear or thermoelectric power plant, and waste water. More particularly, the present invention relates to filtration equipment comprising a filter vessel, a common upper filtrate collection compartment partitioned with a fluid-tight partition in the filter vessel, a lower filtrate collection casing, and a plurality of hollow fiber modules vertically disposed in the filter vessel between the fluid-tight partition and the lower filtrate collection casing and fluid-tightly joined with the lower filtrate collection casing through respective jointing means while enabling the filtrate to be collected from both the top and bottom ends of the hollow fiber modules.

2. Related Art

In conventional filtration equipment using hollow fiber modules, the hollow fiber modules are simply suspended from a watertight partition, or module support, horizontally disposed in a filter vessel, wherein the filtrate is collected on the upper side of the hollow fiber modules and then withdrawn, or discharged, out of the filter vessel.

More specifically, each of the hollow fiber modules used in the conventional filtration equipment comprises a large number of porous hollow fibers having open top and bottom ends and enclosed in a cylindrical housing having the bottom end thereof covered by a lower header, or lower manifold, defining a lower filtrate collection chamber having no outlet port, and the cylindrical housing has a number of perforations formed through the longitudinal wall thereof for passing feed water therethrough. The filter vessel is partitioned with the watertight partition horizontally disposed therein to form a common upper filtrate collection compartment provided for all the hollow fiber modules and disposed on the upper side of the hollow fiber modules. Feed water entering the cylindrical housings of the hollow fiber modules through their perforations is allowed to permeate porous hollow fibers substantially all over the longitudinal length thereof by means of a hydraulic pressure to thereby effect filtration of the feed water through the walls, or membranes, of the porous hollow fibers into the bores thereof, through which the filtrate is then moved simultaneously downward and upward and then collected in the respective lower filtrate collection chambers of the hollow fiber modules and the common upper filtrate collection compartment of the filter vessel. Every hollow fiber module is provided with a conduit, or central tube, extending from the lower filtrate collection chamber thereof to the common upper filtrate collection compartment. The filtrate collected in the lower filtrate collection chambers of the hollow fiber modules is transported, or shunted, therefrom through the conduits of the hollow fiber modules to the common upper filtrate collection compartment.

Accordingly, all the filtrate is withdrawn, or discharged, out of the filter vessel via the above-mentioned common upper filtrate collection compartment located in the upper part of the filter vessel.

Thus, the foregoing conventional filtration equipment using the hollow fiber modules, though it is of a system wherein the filtrate is collected from both ends of every porous hollow fiber, necessitates the comparatively thin conduits, or central tubes, running from the respective lower filtrate collection chambers of the hollow fiber modules to the top ends thereof to transport, or shunt, the filtrate collected in the lower filtrate collection chambers into the common upper filtrate collection compartment.

This entails addition of a fluid pressure loss through the conduits to the resistance of the membranes of the porous hollow fibers to permeation of water. As a result, the outer membrane surfaces of the upper portions of the porous hollow fibers are more liable to fouling than the outer membrane surfaces of the lower portions of the porous hollow fibers. Hence, it is impossible efficiently to use the porous hollow fibers substantially all over the longitudinal length thereof. Further, since the conduits are provided inside the respective hollow fiber modules, spaces occupied by the conduits cannot be filled with porous hollow fibers, thus lowering the filtration efficiency of the hollow fiber modules.

A filter vessel designed to solve the foregoing problems was proposed, which comprises upper and lower watertight partitions horizontally disposed in the filter vessel to form upper, intermediate and lower compartments, and a plurality of hollow fiber modules installed in the intermediate compartment, and wherein feed water fed into the intermediate compartment is filtered through the walls of porous hollow fibers in the hollow fiber modules, while the filtrate is collected simultaneously into the upper and lower compartments via the open top and bottom ends of the porous hollow fibers and then discharged from the upper and lower compartments out of the filter vessel (Japanese Patent Laid-Open No. 197,106/1987). In this filter vessel, each hollow fiber module is watertightly joined not only with the upper watertight partition but also with one of lower filtrate collection tubes thrusted through the lower watertight partition by means of a connector to communicate with the lower compartment via the lower filtrate collection tube, and the lower watertight partition is usually welded with the shell plate of the filter vessel to secure the watertight interface therebetween. Thus, removal of the lower watertight partition out of the filter vessel is substantially impossible. This entails a very complicated and costly procedure of inspection and repair of filter vessel internals. More specifically, the above-mentioned procedure involves a series of steps: removal of the upper end plate of the filter vessel, removal of all the hollow fiber modules, removal of the upper watertight partition, inspection and repair of the filter vessel internals, restoration of the upper watertight partition to its place, installation of all the hollow fiber modules, inspection of the jointed state of the hollow fiber modules after installation thereof, and restoration of the upper end plate of the filter vessel to its place. Skilled workmen must enter the filter vessel to inspect and repair therein the lower watertight partition and the lower filtrate collection tubes which cannot substantially be removed out of the filter vessel. Furthermore, the jointed state of the lower part of each hollow fiber module cannot be confirmed and inspected outside the filter vessel because the lower watertight partition fitted with the lower filtrate collection tubes thrusted therethrough cannot substantially be removed out of the filter vessel. This lowers the reliability and certainty of the joints between the hollow fiber modules and the lower filtrate collection tubes.

The foregoing problems may be solved by using a plurality of lower manifolds each provided with at least one conduit communicating with a common upper filtrate collection compartment partitioned with a watertight partition in a filter vessel instead of the lower watertight partition for providing the lower compartment of the foregoing prior art filter vessel (Japanese Patent Application No. 227,259/1993 filed by the assignee of the instant application on Sep. 13, 1993). Each of the lower manifolds independent of the filter vessel is constructed of a plurality of lower filtrate collection tubes, a lower header, and said at least one conduit. Thus, the filtrate from the bottom ends of hollow fiber modules is conducted, or guided, into the common upper filtrate collection compartment via the lower filtrate collection tubes, lower headers and conduits of the lower manifolds to be combined with the filtrate from the upper outlet ports of the hollow fiber modules in the common upper filtrate collection compartment, from which all the filtrate is discharged out of the filter vessel. However, the foregoing structure of filtration equipment involves the following problems. In fabrication, or construction, of each of the lower manifolds, cut tubes of a predetermined length for lower filtrate collection tubes are usually welded with a cut tube of a predetermined length for a lower header, which is also usually welded with at least one cut tube of a predetermined length for a conduit. The inner diameters of these three kinds of cut tubes are determined, having regard to the respective flow rates and permissible pressure losses of the filtrate passed therethrough. Accordingly, as the number of hollow fiber modules for each lower manifold is increased, the diameters of the lower header and the conduit(s) must generally be increased because the flow rate of the filtrate passed therethrough is increased. The inner diameter of the lower header must be larger than that of the lower filtrate collection tubes because the filtrate from the lower outlet ports of the hollow fiber modules for each lower manifold is all combined in the lower header via the lower filtrate collection tubes. The inner diameter of the conduit(s) is usually further larger than that of the lower header. Thus, the structure of the Lower manifolds is inevitably complicated to present a difficult problem from the standpoint of fabrication thereof. Since the lower headers, usually in a tubular form, are horizontally disposed at given intervals, the space secured for the lower headers as flow paths of the filtrate cannot be made the most of in the vertical as well as horizontal direction thereof. Further, the distance between the lower headers must be inevitably increased in proportion to an increase in the diameter of the conduits for securing welding space to enlarge the intervals between the hollow fiber modules, with the result that the diameter of the filter vessel must be uneconomically increased for a given throughput, i.e., the utilization of the space inside the filter vessel is decreased. Furthermore, the configurations of the lower manifolds are so uneven and complicated that a difficulty is encountered not only in fabrication of the lower manifolds themselves but also in fabrication of an air distributor, if any, for providing paths of air bubbles for periodical air scrubbing therewith of porous hollow fibers in the hollow fiber modules. Moreover, since the lower manifolds are fabricated independently of formation of module insertion perforations through the watertight partition, the lower filtrate collection tubes of the lower manifolds are liable to positional deviation in the horizontal direction thereof from the module insertion perforations of the watertight partition. Accordingly, the lower manifolds must be fabricated in such a way that the positions of the lower filtrate collection tubes are so very high in dimensional accuracy as to avoid damage to the hollow fiber modules due to flexure of the hollow fiber modules at the time of installation thereof. Thus, fabrication of the lower manifolds is inevitably uneconomical because of many restrictions imposed thereon.

Accordingly, an object of the present invention is to provide filtration equipment using hollow fiber modules wherein porous hollow fibers can be efficiently used substantially all over the longitudinal length thereof and the filtration efficiency of the hollow fiber modules can be enhanced.

Another object of the present invention is to provide filtration equipment wherein filter vessel internals can be simply and inexpensively inspected and repaired with high reliability and certainty.

Still another object of the present invention is to provide filtration equipment wherein filter vessel internals can be simply and economically fabricated with a high utilization of the space inside a filter vessel.

SUMMARY OF THE INVENTION

In accordance with the present invention, there is provided filtration equipment comprising a filter vessel, a plurality of hollow fiber modules each having upper and lower filtrate outlet ports as well as vertically disposed and upward-detachably, or upward-removably, fixed in the filter vessel, a common upper filtrate collection compartment provided in the upper part of the filter vessel and communicating with the upper filtrate outlet ports of the hollow fiber modules, a lower filtrate collection casing having no outlet port and communicating with the lower filtrate outlet ports of the hollow fiber modules, and at least one conduit for allowing the lower filtrate collection casing to communicate therethrough with the common upper filtrate collection compartment, the hollow fiber modules being fluid-tightly joined with the lower filtrate collection casing by means of respective jointing means each provided for one hollow fiber module; and wherein fluid fed into the filter vessel is filtered through the walls of porous hollow fibers in the hollow fiber modules, while the filtrate is conducted, or guided, into the common upper filtrate collection compartment via the upper filtrate outlet ports of the hollow fiber modules as well as via the lower filtrate outlet ports of the hollow fiber modules, the lower filtrate collection casing and said at least one conduit, and the filtrate collected in the common upper filtrate collection compartment is then withdrawn, or discharged, therefrom out of the filter vessel.

In the filtration equipment of the present invention, the lower filtrate collection casing having no outlet port is generally constructed of a side plate such as a circular side plate, a lower plate, and an upper plate fitted with connecting means, e.g., connecting pipes, for connecting the hollow fiber modules with the lower filtrate collection casing to enable the filtrate flowing out of the hollow fiber modules via the lower filtrate outlet ports thereof to be collected in the lower filtrate collection casing, and may further be fluid-tightly fitted with flow-through tubes vertically thrusted through the casing for providing flow paths of feed water and/or gas tubes (e.g., air tubes in particular) vertically thrusted through the casing for providing flow paths of gas bubbles (e.g., air bubbles) for periodical gas (e.g., air in particular) scrubbing therewith of porous hollow fibers in the hollow fiber modules as will be described later. The flow-through tubes serve not only to allow feed water to pass therethrough from the lower side of the lower filtrate collection casing to the upper side thereof without any trouble, but also to facilitate drainage of water on the upper side of the lower filtrate collection casing without any trouble when water in the filter vessel is to be drained out of the filter vessel. However, the flow-through tubes are not necessarily provided in the case where the gas tubes can perform the foregoing functions of the flow-through tubes.

In the filtration equipment of the present invention, the number of hollow fiber modules may be determined depending upon various conditions such as the kind and amount of fluid to be subjected to filtration, and the type and capacity of the hollow fiber modules. In general, however, the number of hollow fiber modules may be in the range of 2 to 30, preferably 3 to 20, in the case of industrial waste water or the like, and in the range of 20 to 500, preferably 30 to 300, in the case of condensate water or the like.

In the filtration equipment of the present invention, each jointing means may be integrated either with the corresponding hollow fiber module or with the lower filtrate collection casing.

In the filtration equipment of the present invention, each jointing means is preferably capable of vertical elastic movement.

In the filtration equipment of the present invention, a guide mechanism for facilitating positioning of the hollow fiber modules to respective predetermined positions is preferably provided in the filter vessel. An example of the guide mechanism is a guide plate having perforations for thrusting therethrough the lower parts of the respective hollow fiber modules to facilitate positioning of the hollow fiber modules to respective predetermined positions.

In the filtration equipment of the present invention, the lower filtrate collection casing is preferably provided with a skirt extending downward and disposed along the periphery of the casing for retaining therewith a scrubbing gas (e.g., scrubbing air in particular) on the lower side of the lower filtrate collection casing, and gas tubes (of the kind as described before) vertically thrusted through the casing and having perforations formed through the lower walls thereof located on the lower side of the casing for guiding the scrubbing gas to the lower parts of the hollow fiber modules. The lower filtrate collection casing provided with the skirt and the gas tubes can also advantageously serve as a bubble distributor (e.g., an air distributor in particular) for distributing gas bubbles (e.g., air bubbles in particular) to the hollow fiber modules to scrub porous follow fibers in the hollow fiber modules with the gas bubbles. Gas (e.g., air in particular) fed on the lower side of the lower filtrate collection casing and once retained there with the skirt is conducted, or guided, in the form of bubbles to the lower parts of the hollow fiber modules via the perforations of the gas tubes and the bores of the gas tubes. Of course, a conventional bubble distributor (e.g., an air distributor in particular) or an alteration thereof may alternatively be used in so far as the paths of scrubbing gas bubbles to conduct therethrough the scrubbing gas bubbles to the lower parts of the hollow fiber modules can be secured. As an example of such a bubble distributor, a bubble distribution mechanism essentially consisting of a gas distributor panel having perforations under the hollow fiber modules and perforated bubble distributor tubes attached to the gas distributor panel and extending downward from the respective perforations of the gas distributor panel may be disposed on the lower side of the lower filtrate collection casing. In this case, gas tubes of the kind as described before are vertically thrusted through and fluid-tightly attached to the lower filtrate collection casing to allow scrubbing gas bubbles to rise up through the gas tubes. In this bubble distribution mechanism, gas (e.g., air in particular) fed on the lower side of the gas distributor panel is conducted, or guided, in the form of bubbles to the lower parts of the hollow fiber modules via the perforations of the perforated bubble distributor tubes, the perforations of the gas distributor panel and the gas tubes of the lower filtrate collection casing.

BRIEF DESCRIPTION OF THE DRAWINGS

The foregoing and other objects, features and advantages of the present invention will be better understood from the following description taken in connection with the accompanying drawings, in which.

BEST MODES FOR CARRYING OUT THE INVENTION

Although the filtration equipment of the present invention can be used for filtration of a variety of fluids, the term "feed water" is used as representing an example of the object of filtration in the following Example. Further, although a variety of gases can be used for scrubbing therewith porous hollow fibers, air is used in the following Example from a practical point of view.

EXAMPLE

Figure 1:
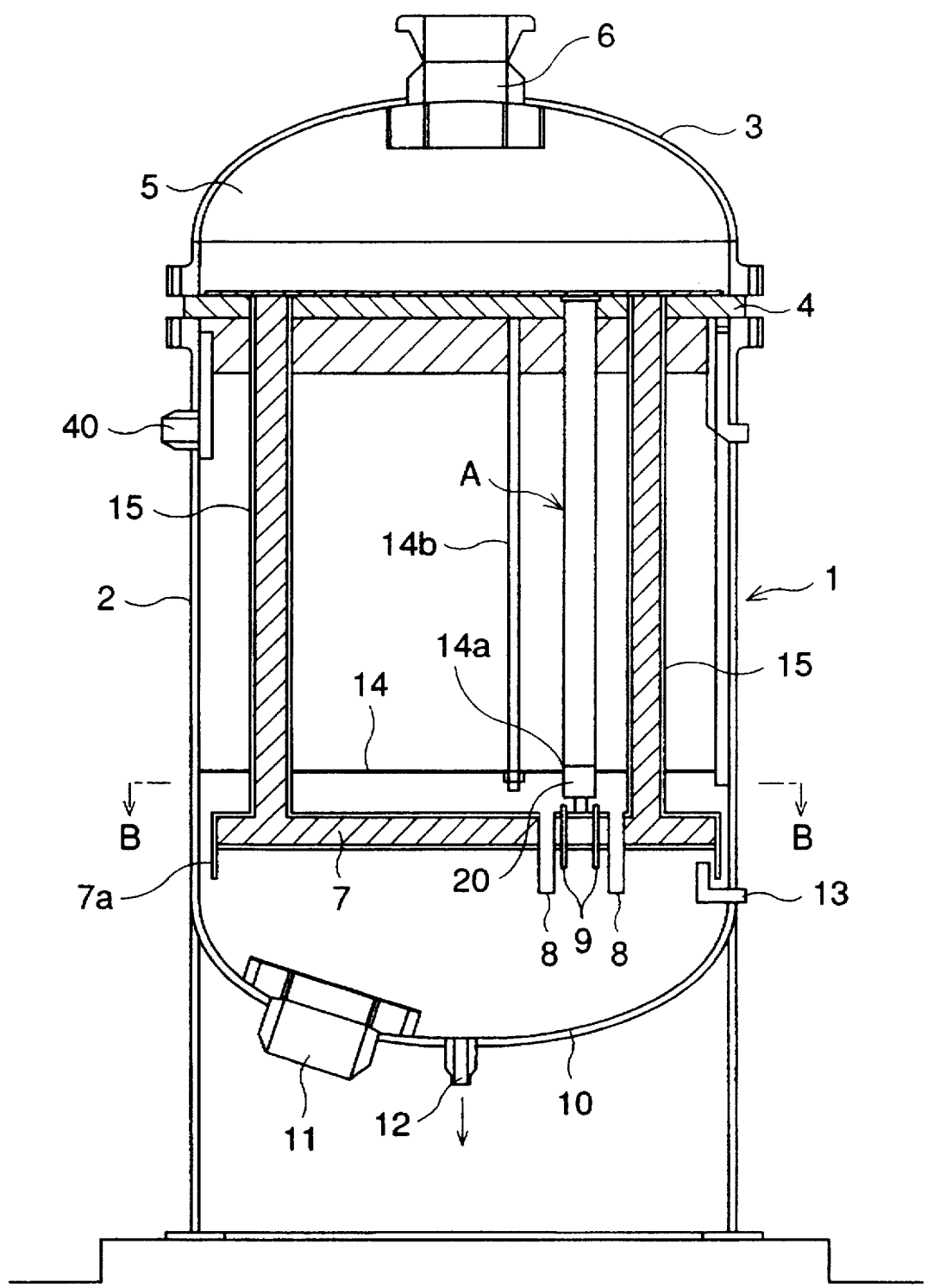
FIG. 1 is a schematic sectional view of an example of filtration equipment using hollow fiber modules according to the present invention.
Figure 2:
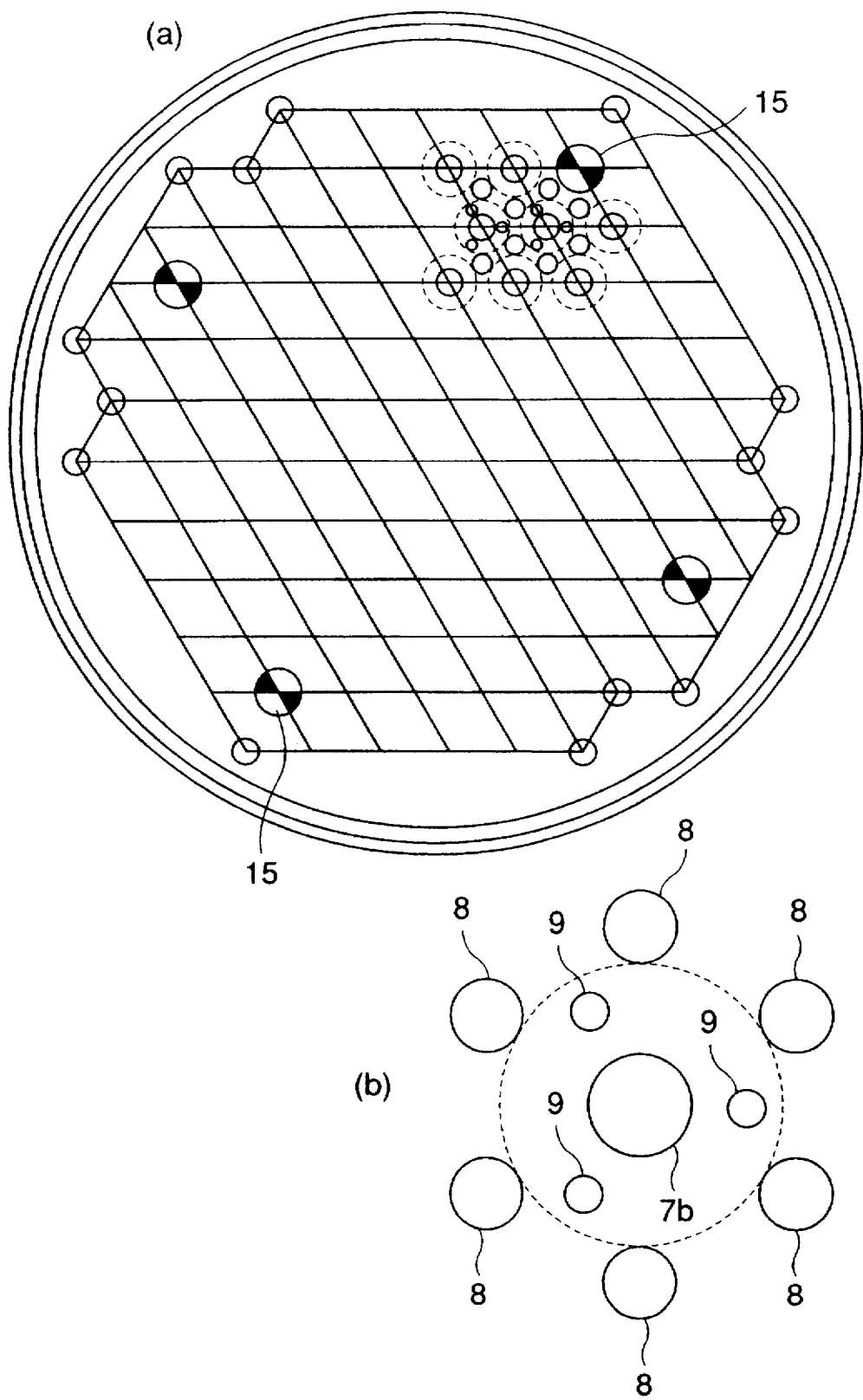
FIG. 2 (a) is a schematic sectional plan view of the filtration equipment taken along line B—B of FIG. 1 and viewed in the direction of arrows, while FIG. 2 (b) is an enlarged view of an essential part of FIG. 2 (a)
Figure 3:
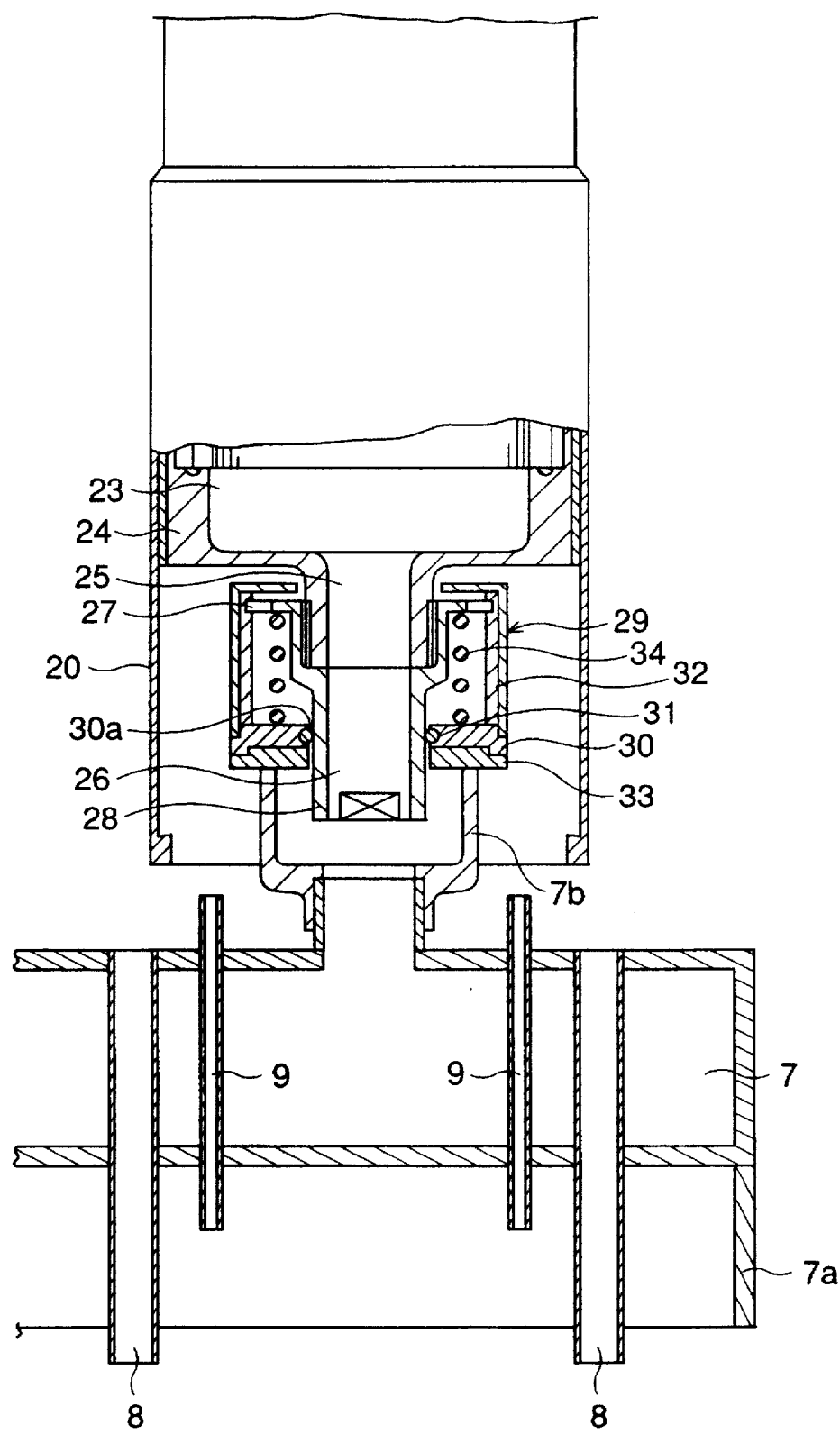
FIG. 3 is a longitudinal sectional view illustrating a mechanism of joining a hollow fiber module with a lower filtrate collection casing via the corresponding connecting pipe thereof, as illustrated in FIG. 1.

FIGS. 1 to 3 illustrates an example of filtration equipment using hollow fiber modules according to the present invention. Only one hollow fiber module A is illustrated representatively in FIG. 1, but actually the filtration equipment includes a number of hollow fiber modules A.

As shown in FIG. 1, a filter vessel 1 long in the vertical direction thereof includes a common upper filtrate collection compartment 5 located inside an upper end plate 3, or upper end cover, attached on the upper side of a shell plate 2, and watertightly partitioned off from the body with a watertight partition 4. The upper end plate 3 is provided at the top thereof with an upper filtrate outlet 6 through which the filtrate collected in the common upper filtrate collection compartment 5 is withdrawn, or discharged, out of the filter vessel 1. The watertight partition 4 is interposed between the upper end plate 3 and the upper end of the shell plate 2.

As also shown in FIG. 1, a discoid lower filtrate collection casing 7 having no outlet port and comprising an upper plate, a lower plate and a circular side plate is disposed in the lower part of the body of the filter vessel 1 surrounded by the shell plate 2. As illustrated in FIGS. 2 (a) and (b) as well as in FIG. 1, a plurality of flow-through tubes 8 vertically thrusted through and watertightly attached to, e.g., welded with, the lower filtrate collection casing 7 for allowing the lower internal portion of the filter vessel 1 below the casing 7 to communicate therethrough with the middle internal portion of the filter vessel 1 above the casing 7 are disposed around the extention of the axis of every hollow fiber module A, as will be described later in detail, in such a way that an imaginary circle represented by the broken line in FIG. 2 (b) is concentric with the hollow fiber module A. In this case, the broken line in FIG. 2 (b) also represents the outer periphery of the hollow fiber module A located above the flow-through tubes 8, the number and positions of which are however not particularly limited to those as illustrated in FIG. 2 (b). As also illustrated in FIGS. 2 (a) and (b) as well as in FIG. 1, a plurality of air tubes 9 vertically thrusted through and watertightly attached to, e.g., welded with, the lower filtrate collection casing 7 are disposed on the inner side of the above-mentioned imaginary circle, and these air tubes 9 have perforations formed through the lower walls thereof located on the lower side of the lower filtrate collection casing 7 for ejecting air through the perforations thereof and conducting, or guiding, the resulting air bubbles to the lower part of the hollow fiber module A to scrub porous hollow fibers in the hollow fiber module A with the air bubbles. The lower internal portion of the filter vessel 1 below the casing 7 communicates with the middle internal portion of the filter vessel 1 above the casing 7 via the air tubes 9 as well, and hence the flow-through tubes 8 may be dispensed with in some cases. The number of air tube(s) 9 for every hollow fiber module is not particularly limited, and may be at least one. The lower filtrate collection casing 7 is provided along the periphery thereof with a skirt 7a extending downward as illustrated in FIG. 1. An air feeding pipe 13 disposed near the lower end of the shell plate 2 has the tip thereof extending into a zone surrounded by the skirt 7a. Accordingly, air fed into the zone surrounded by the skirt 7a via the air feeding pipe 13 forms an air layer in that zone, and is conducted, or guided, in the form of air bubbles to the lower part of the hollow fiber module A via the perforations of the air tubes 9 and the bores of the air tubes 9. Additionally stated, the flow-through tubes 8 and the air tubes 9 thrusted through and watertightly attached to the lower filtrate collection casing 7 can play the role of reinforcements for the lower filtrate collection casing 7.

When porous hollow fibers in the hollow fiber modules A are to be vibrated and thus scrubbed with air bubbles to dislodge, or exfoliate, foulants deposited on the outer membrane surfaces of the porous hollow fibers through filtration of feed water, compressed air is fed into the above-mentioned zone surrounded by the skirt 7a on the lower side of the lower filtrate collection casing 7 via the air feeding pipe 13 to form an air layer separated from water thereunder and having a thickness smaller than the length of the lower parts of the air tubes 9 located on the lower side of the lower filtrate collection casing 7 in this case. Air of the air layer is pushed into the bores of the air tubes 9 via the perforations thereof and then ascends in the form of air bubbles through the bores of the air tubes 9 to reach the lower parts of the hollow fiber modules A. Substantially all the amount of scrubbing air fed is used to scrub therewith the porous hollow fibers in the hollow fiber modules A. Additionally stated, a valve (not shown in FIG. 1) for an air vent 40 as shown in FIG. 1 is opened during the course of air scrubbing to discharge therethrough air used in the air scrubbing out of the filter vessel 1. Air passed in the form of air bubbles through the hollow fiber modules A while vibrating the porous hollow fibers therein reaches the air vent 40 via the uppermost perforations of the cylindrical housings 18 of the hollow fiber modules A.

As shown in FIGS. 1 and 2 (a), the lower filtrate collection casing 7 is further provided with a plurality [four in the case of FIG. 2 (a)] of conduits 15 thicker than the hollow fiber modules A. The tops of the conduits 15 are watertightly attached to the watertight partition 4. The filtrate flowing out of the hollow fiber modules A via the lower outlet ports thereof and collected in the lower filtrate collection casing 7 is passed through the conduits 15 to enter the common upper filtrate collection compartment 5 wherein it is combined with the filtrate flowing out of the hollow fiber modules via the upper outlet ports thereof. The combined filtrate is withdrawn, or discharged, from the filtrate collection compartment 5 through the upper filtrate outlet 6 out of the filter vessel 1.

As shown in FIG. 1, a lower end plate 10 welded with the shell plate 2 is provided with a feed water feeding inlet 11 and a drain pipe 12. Feed water is fed through the feed water feeding inlet 11, while waste water resulting from the air scrubbing is drained out of the filter vessel 1 through the drain pipe 12.

As shown in FIG. 1, the filter vessel 1 is provided with a thin guide plate 14 via a support rod 14b, or tie rod, on the upper side of the lower filtrate collection casing 7. Only one support rod 14b, or tie rod, is illustrated representatively in FIG. 1, but a plurality of support rods are generally used to support the guide plate 14. The guide plate 14 has perforations 14a in given positions thereof for thrusting therethrough the corresponding lower parts of the hollow fiber modules A. The guide plate 14 facilitates positioning of the hollow fiber modules A and hence joining of the hollow fiber modules A with the lower filtrate collection casing 7 when the hollow fiber modules A are thrusted one by one through the respective perforations of the guide plate 14.

The structure of a hollow fiber module A will now be described in detail.

Figure 5:
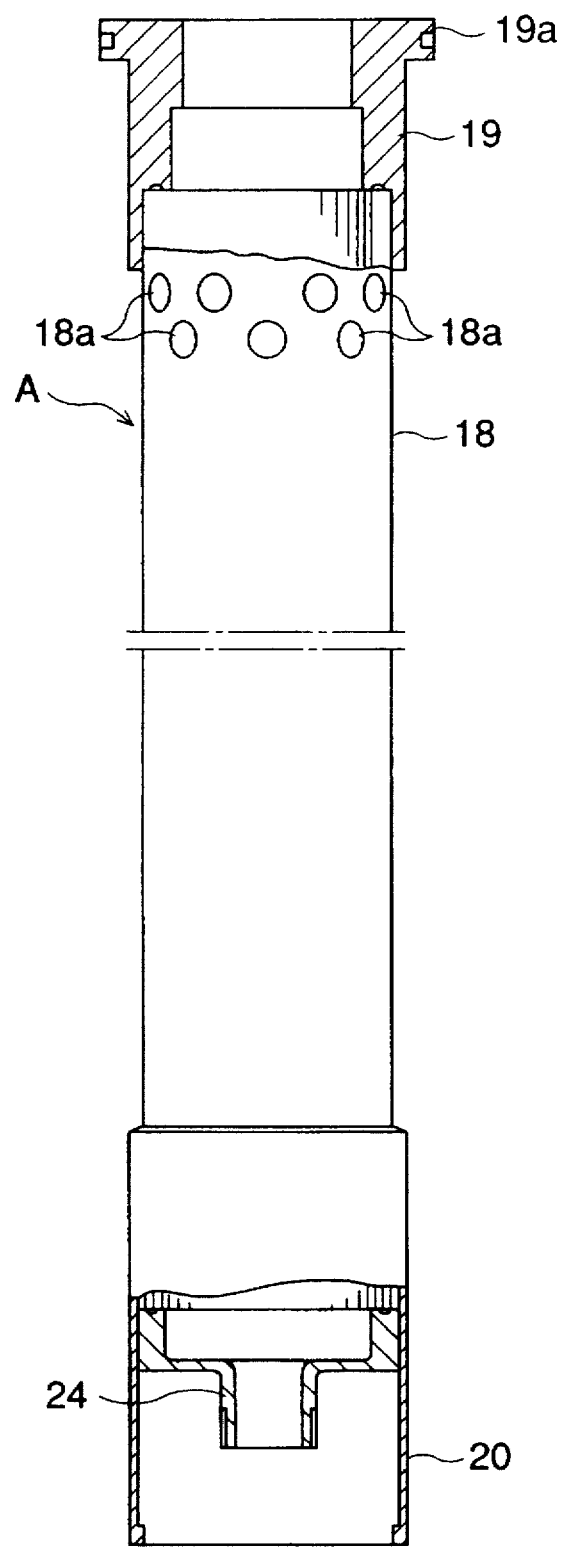
FIG. 5 is a schematic side view of a hollow fiber module as shown in FIG. 1.
Figure 6:
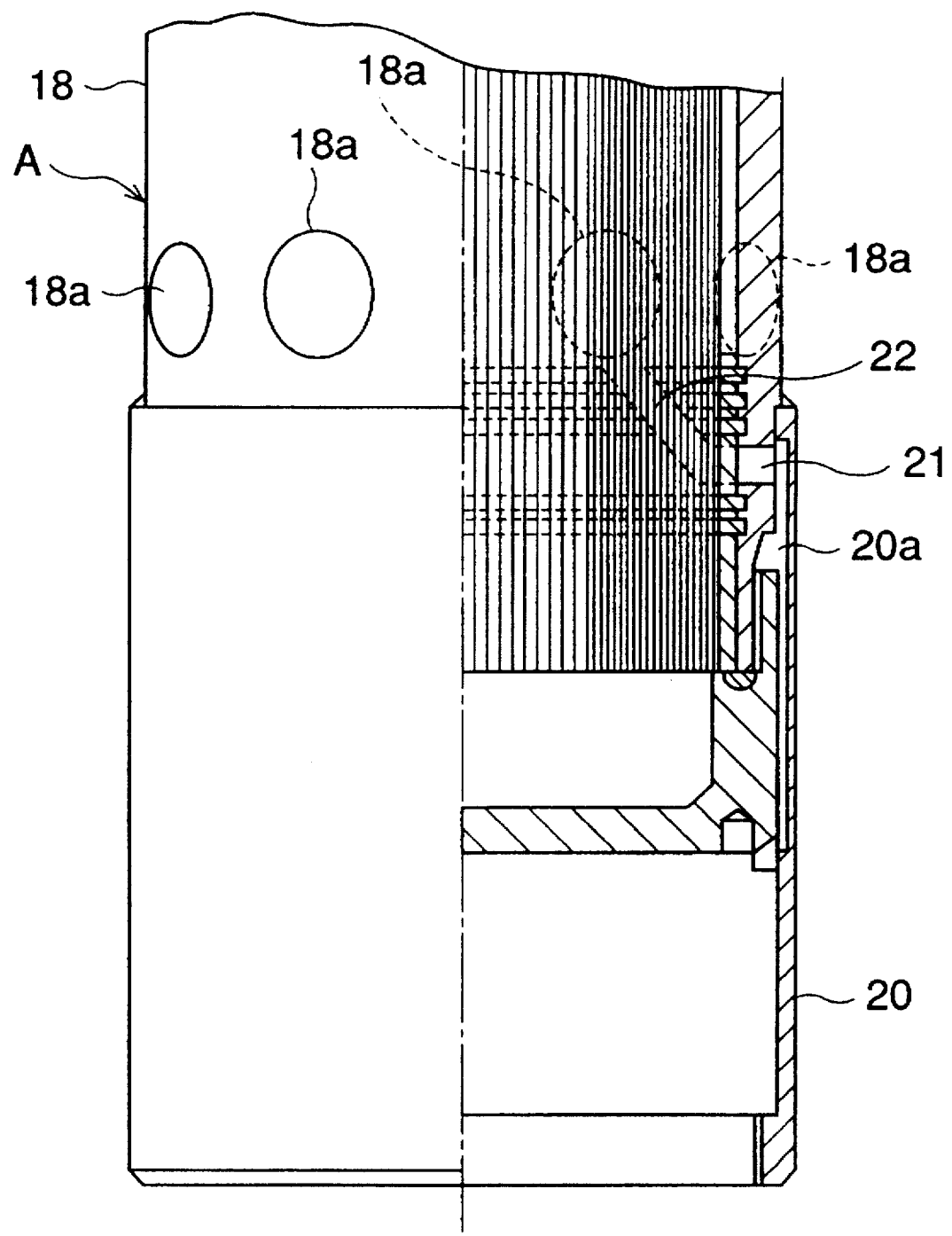
FIG. 6 is a partly sectional side view illustrating the detailed structure of a lower part of the hollow fiber module of FIG. 5.

The upper and lower end portions of the porous hollow fibers arrayed inside the cylindrical housing 18 of the hollow fiber module A are bound, or potted, without occlusion of the central bores of the porous hollow fibers. As shown in FIG. 5, the upper part of the cylindrical tubular housing 18 of the hollow fiber module A is fitted with a fixing ring 19 having a flange 19a for fixing the hollow fiber module A to the watertight partition 4. On the other hand, the lower part of the cylindrical housing 18 of the hollow fiber module A is fitted with a cylindrical cover 20 (see FIGS. 1, 3, 4, 5 and 6) for collecting bubbles of the aforementioned scrubbing air and then conducting, or guiding, the scrubbing air bubbles into the cylindrical housing 18. As illustrated in FIG. 6, an inner wall groove(s) 20a is formed in the inner wall portion of the cylindrical cover 20, while air intakes 21 corresponding to the inner wall groove(s) 20a are formed through the lower wall of the cylindrical housing 18 and inner wall air-introducing grooves 22 communicating with the corresponding air intakes 21 are further formed in the lower inner wall portion of the cylindrical housing 18. Scrubbing air bubbles collected inside the cylindrical cover 20 are conducted, or guided, to the lower parts of porous hollow fibers via the inner wall groove(s) 20a, the air intakes 21 and the inner wall air-introducing grooves 22 to scrubb the outer membrane surfaces of the porous hollow fibers with the scrubbing air bubbles.

Feed water inflow perforations 18a (see FIGS. 5 and for allowing inflow therethrough of feed water into the cylindrical housing 18 are formed through the upper and lower wall portions of the cylindrical housing 18. Feed water conducted, or guided, into the cylindrical housing 18 through the feed water inflow perforations 18a is filtered with the porous membranes of the porous hollow fibers. The filtrate is conducted upward as well as downward through the bores of the porous hollow fibers. As illustrated in FIG. 1, the filtrate conducted upward is collected in the common upper filtrate collection compartment 5, from which it is then passed through the upper filtrate outlet 6 to be withdrawn, or discharged, out of the filter vessel 1, while the filtrate conducted downward is passed through the jointing adapter to be collected in the lower filtrate collection casing 7, from which it is then passed through the conduits 15 to enter the common upper filtrate collection compartment 5 to be combined therein with the above-mentioned filtrate conducted upward. Thus, all the filtrate is withdrawn, or discharged, from the common upper filtrate collection compartment 5 through the upper filtrate outlet 6 out of the filter vessel 1.

In this Example, each hollow fiber module A is thrusted through one of insertion openings formed through the watertight partition 4 from above the body of the filter vessel 1 surrounded by the shell plate 2, and the lower end portion of the hollow fiber module A is further thrusted through one of the perforations 14a of the guide plate 14 to elastically join the hollow fiber module A with the corresponding connecting pipe 7b of the lower filtrate collection casing 7 by means of the jointing adapter provided in the lower part of the hollow fiber module A as illustrated in FIG. 3, while the flange 19a of the fixing ring 19 provided around the upper part of the cylindrical housing 18 is fixed by bolting a setting plate, or keep plate, on the watertight partition 4 with the flange 19a therebetween (not illustrated in any figures). The upper plate of the lower filtrate collection casing 7 is fitted with, e.g., welded with, a plurality of connecting pipes 7b of the kind as described above.

The jointing adapter will now be described in detail while referring mainly to FIG. 3.

The porous hollow fibers are arrayed inside the cylindrical tubular housing 18 fitted at the bottom thereof with a mouthpiece 24, or bottom fitting, (see also FIG. 5) having a lower filtrate collection chamber 23 and a filtrate discharge orifice 25. A connecting tube 28 having a filtrate discharge tube portion 26 and a flange 27 is screwed around the outer wall of the mouthpiece 24 around the filtrate discharge orifice 25 thereof. A cap member 29, or spring retainer, beyond which the filtrate discharge tube portion 26 of the connecting tube 28 is jutted downward is disposed around the connecting tube 28. The cap member 29 has a bottom block plate 30, or spring stop, between which and the flange 27 a spring 34 is elastically fitted to always energize therewith the cap member 29 downward. The filtrate discharge tube portion 26 of the connecting tube 28 is vertically-movably thrusted through a hole 30a formed through the bottom block plate 30. An O-ring 31 fitted along the periphery of the hole 30a prevents the filtrate from leaking out of the adapter and also prevents feed water or waste water from entering the lower filtrate collection casing 7 via the corresponding connecting pipe 7b thereof.

Additionally stated, guide rods 32 extending from the ceiling of the cap member 29 to the bottom of the cap member 29 are run through notches formed in the flange 27 of the cap member 29 to hinder revolution of the cap member 29 around the axis thereof while ensuring only vertical movement of the cap member 29 in relation with the connecting tube 28.

On the other hand, the upper part of the connecting pipe 7b is in contact with a rubber sheet 33, or gasket, adhered to the lower surface of the bottom block plate 30, or spring stop, to keep watertight the interface between the adapter and the connecting pipe 7b by means of the elastic force, or resilience, of the spring 34 of the adapter.

As described hereinbefore, when the hollow fiber module A is inserted into the body of the filter vessel 1 from above to have the lower part of the hollow fiber module A passed through the guide plate 14 and positioned to a predetermined position corresponding to one of the connecting pipes 7b of the lower filtrate collection casing 7, the adapter provided in the lower part of the hollow fiber module A is automatically joined with the corresponding connecting pipe 7b of the lower filtrate collection casing 7 while ensuring the watertight interface therebetween to enable the filtrate to be collected through both the top and bottom ends of the hollow fiber module A. In the foregoing operation, no special works are necessary for connecting the lower part of the hollow fiber module A with the corresponding connecting pipe 7b of the lower filtrate collection casing 7. This well facilitates not only the operation of installing a number of hollow fiber modules A but also the operation of removing said number of the hollow fiber modules A. Further, even if there is some deviation of the axis of the connecting pipe 7b from the axis of the jointing adapter provided in the lower part of the hollow fiber module A, this axial deviation can be absorbed in this case by the larger diameter of the upper part of the connecting pipe 7b than that of the filtrate discharge tube portion 26. Furthermore, elongation or shrinkage of the hollow fiber module A due to a change in temperature can be absorbed by downward or upward movement of the cap member 29 of the adapter because the cap member 29 is vertically movable.

Additionally stated, although the jointing adapter capable of vertical elastic movement is provided in the lower part of the hollow fiber module A to watertightly join the hollow fiber module A with the connecting pipe 7b by means of the adapter in the foregoing case, the connecting pipe 7b may alternatively be fitted with a jointing adapter capable of functioning like the above-mentioned jointing adapter.

Figure 4:
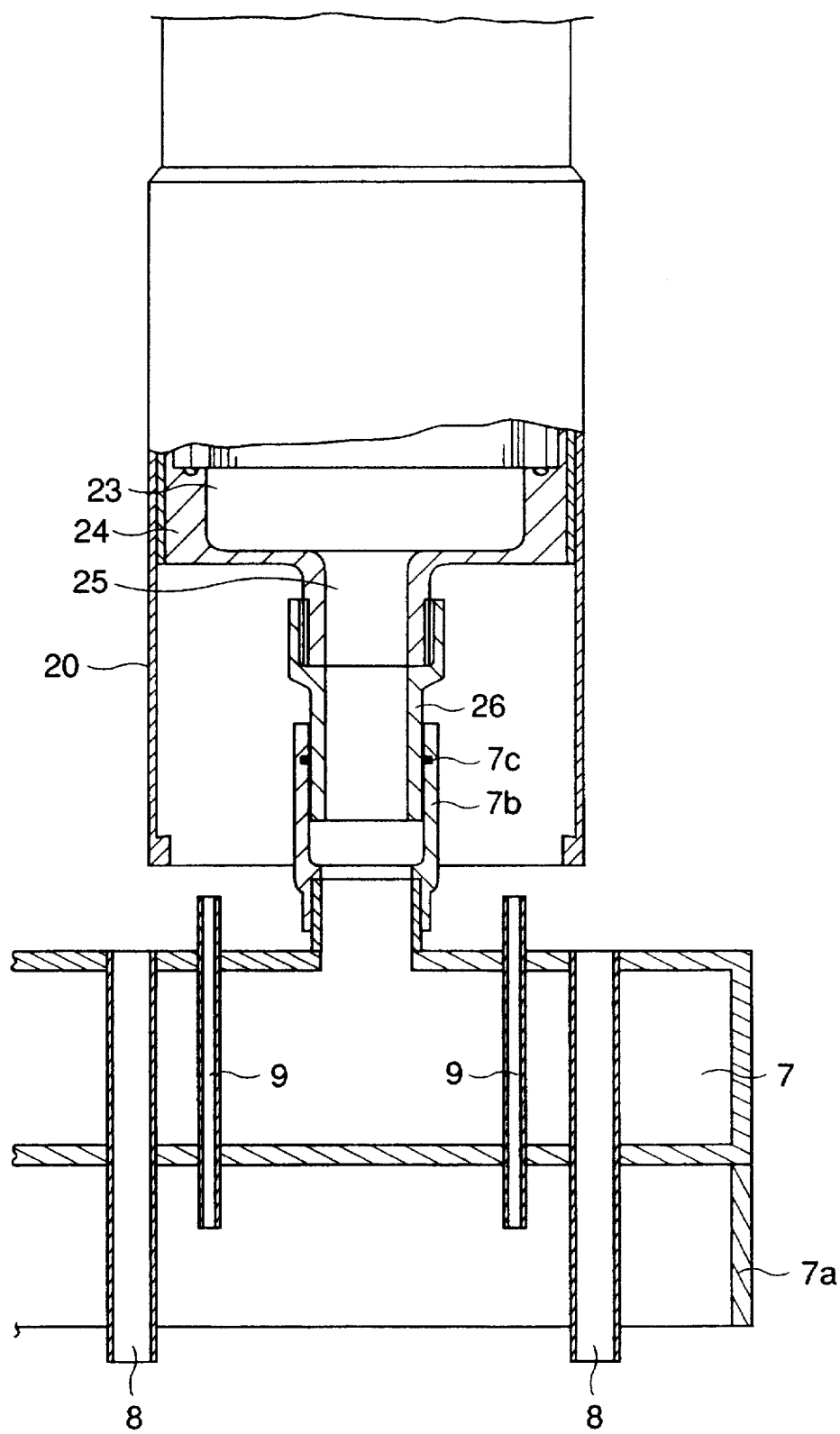
FIG. 4 is a longitudinal sectional view illustrating another mechanism of joining a hollow fiber module with a lower filtrate collection casing via the corresponding connecting pipe thereof, as illustrated in FIG. 1.

Instead of using the adapter of the kind as described above, the filtrate discharge tube portion 26 of a connecting tube may be vertically slidably fitted right into the connecting pipe 7b of the lower filtrate collection casing 7 to join a hollow fiber module with the connecting pipe 7b while keeping watertight the interface of the connecting pipe 7b with the filtrate discharge tube portion 26 by means of an O-ring 7c fitted along the inner circumference of the connecting pipe 7b, as illustrated in FIG. 4, wherein the same reference numerals as in FIG. 3 refer to the same members, parts or portions as in FIG. 3.

Additionally stated, although the filtrate discharge tube portion 26 is fitted right into the connecting pipe 7b in the foregoing case, the connecting pipe 7b may alternatively be such that it is fitted right into the filtrate discharge tube portion 26 with an O-ring fitted along the outer circumference of the connecting pipe 7b.

As described hereinbefore, according to the present invention, the filtrate can be collected in a common upper filtrate collection compartment from both the top and bottom ends of long hollow fiber modules with no central tube, and then withdrawn, or discharged, from the common upper filtrate collection compartment out of a filter vessel. The filtrate collected in a lower filtrate collection casing from the bottom ends of the hollow fiber modules is transported to the common upper filtrate collection compartment through a comparatively thick conduit(s) to minimize the pressure loss through the conduit(s). Thus, the hollow fiber modules can be efficiently used substantially all over the longitudinal length thereof with a high filtration efficiency.

Particularly where a jointing means for joining a hollow fiber module with the lower filtrate collection casing is capable of vertical elastic movement, merely mounting the hollow fiber module from above enables the hollow fiber module to be automatically joined with the lower filtrate collection casing to make easy the work of joining, or connecting, the hollow fiber module with the lower filtrate collection casing. This facilitates not only the operation of installing hollow fiber modules but also the operation of removing the hollow fiber modules. In this case, furthermore, elongation and shrinkage of the hollow fiber module due to a change in temperature can be absorbed by the vertical elastic movement of the jointing means to prevent the hollow fiber module and the like from being damaged.

The filtrate from the top ends of the hollow fiber modules can be combined with the filtrate from the bottom ends of the hollow fiber modules A in the common upper filtrate collection compartment inside the filter vessel instead of outside the filter vessel to once collect all the filtrate in the common upper filtrate collection compartment, from which all the filtrate is then withdrawn, or discharged, out of the filter vessel. This can reduce the piping work after installation of the filter vessel while decreasing the number of pipings outside the filter vessel to give a streamlined appearance to filtration facilities.

Since the structure, or configuration, of the lower filtrate collection casing is simple, the lower filtrate collection casing can be easily and economically fabricated, or constructed. Further, the space secured for the lower filtrate collection casing as a flow path of the filtrate can be made the most of in the vertical as well as horizontal direction thereof unlike in the case of lower manifolds each comprising a tubular lower header, while the intervals between the hollow fiber modules can be minimized thanks to the configuration of the lower filtrate collection casing. Thus, the utilization of the space inside the filter vessel can be maximized.

The lower filtrate collection casing, the hollow fiber modules, etc. can be simply inserted into the body of the filter vessel from above. On the other hand, since the lower filtrate collection casing is independent of the filter vessel, filter vessel internals such as a fluid-tight partition, the lower filtrate collection casing, the hollow fiber modules, and conduit(s) can be unitedly removed out of the filter vessel without any trouble, and transported, if necessary, to be inspected and repaired outside the filter vessel while at the same time enabling the state of the lower part of every hollow fiber module being joined with the lower filtrate collection casing via one of the connecting means, e.g., connecting pipes, of the latter to be well confirmed and inspected outside the filter vessel to improve the reliability and certainty of the joint therebetween. Thus, inspection and repair of the filter vessel internals can be simply and inexpensively done with high reliability and certainty, while often eliminating the necessity of individual removal and re-installation of the hollow fiber modules, as otherwise always involved in inspection and repair of the filter vessel internals. Accordingly, the filtration equipment of the present invention is greatly improved in the workability thereof including the maintainability and inspectability thereof.

In the filtration equipment of the present invention, each jointing means is integrated either with the corresponding hollow fiber module or with the lower filtrate collection casing (more specifically, one of the connecting means, e.g., connecting pipes, of the lower filtrate collection casing). Thus, when any damage, or breakdown, happens, mere replacement of the damaged part alone with a new one will suffice without seriously affecting the whole filtration equipment.

A guide plate that may be provided in the filter vessel of the filtration equipment of the present invention permits the easy positioning of every hollow fiber module to a predetermined position when the lower portion of the hollow fiber module is thrusted through one of the perforations of the guide plate. Thus, the guide plate facilitates insertion of the hollow fiber module into the body of the filter vessel. Mere insertion of the hollow fiber module enables the hollow fiber module to be installed in the filter vessel by means of the corresponding jointing means in combination with the guide plate while allowing the hollow fiber module to communicate with the lower filtrate collection casing. This greatly facilitates installation of hollow fiber modules in the filter vessel.

A skirt that may be provided under and along the periphery of the lower filtrate collection casing to provide a zone for retaining a gas on the lower side of the lower filtrate collection casing, and gas tubes that may be thrusted through the lower filtrate collection casing and have perforations on the lower side of the casing can provide a unit of a bubble distributor integrated with the lower filtrate collection casing. When the outer membrane surfaces of porous hollow fibers in the hollow fiber modules are to be scrubbed with gas bubbles such as air bubbles in particular, the gas retained in the above-mentioned zone surrounded by the skirt is pushed into the bores of the gas tubes via the perforations of the gas tubes, and ascends in the form of bubbles through the bores of the gas tubes to reach the lower parts of the hollow fiber modules. Thus, the bubble distributor integrated with the lower filtrate collection casing enables the bubbles to be fed into the hollow fiber modules without wasting any bubbles, whereby porous hollow fibers in the hollow fiber modules can be vibrated and thus scrubbed with the bubbles.

What is claimed is:

1. Filtration equipment comprising a filter vessel, a plurality of hollow fiber modules each having upper and lower filtrate outlet ports vertically disposed and upward-detachably fixed in said filter vessel, a common upper filtrate collection compartment provided in the upper part of said filter vessel and communicating with the upper filtrate outlet ports of said hollow fiber modules, a lower filtrate collection casing having no outlet port and communicating with the lower filtrate outlet ports of said hollow fiber modules, and at least one conduit for allowing said lower filtrate collection casing to communicate therethrough with said common upper filtrate collection compartment, said hollow fiber modules being fluid-tightly joined with said lower filtrate collection casing by means of respective jointing means each provided for one hollow fiber module; and wherein fluid fed into said filter vessel is filtered through the walls of porous hollow fibers in said hollow fiber modules, while the filtrate is conducted into said common upper filtrate collection compartment via said upper filtrate outlet ports of said hollow fiber modules as well as via said lower filtrate outlet ports of said hollow fiber modules, said lower filtrate collection casing and said at least one conduit, and the filtrate collected in said common upper filtrate collection compartment is then discharged therefrom out of said filter vessel.

2. Filtration equipment as claimed in claim 1, wherein said lower filtrate collection casing comprises a side plate, a lower plate, and an upper plate fitted with connecting means for connecting said hollow fiber modules with said filtrate collection casing to enable the filtrate flowing out of said hollow fiber modules via said lower filtrate outlet ports thereof to be collected in said lower filtrate collection casing.

3. Filtration equipment as claimed in claim 1, wherein each jointing means is integrated with the corresponding hollow fiber module.

4. Filtration equipment as claimed in claim 1, wherein every jointing means is integrated with said lower filtrate collection casing.

5. Filtration equipment as claimed in claim 1, wherein each jointing means is capable of vertical elastic movement.

6. Filtration equipment as claimed in claim 1, wherein a guide mechanism for facilitating positioning of said hollow fiber modules to respective predetermined positions is provided in said filter vessel.

7. Filtration equipment as claimed in claim 6, wherein said guide mechanism is a guide plate having perforations for thrusting therethrough the lower parts of said hollow fiber modules to facilitate positioning of said hollow fiber modules to respective predetermined positions.

8. Filtration equipment as claimed in claim 1, wherein said lower filtrate collection casing is provided with a skirt extending downward and disposed along the periphery of said lower filtrate collection casing for retaining therewith a scrubbing gas on the lower side of said lower filtrate collection casing, and gas tubes vertically thrusted through said lower filtrate collection casing and having perforations formed through the lower walls thereof located on the lower side of said lower filtrate collection casing for guiding the scrubbing gas to the lower parts of said hollow fiber modules.

* * * * *

UNITED STATES PATENT AND TRADEMARK OFFICE
CERTIFICATE OF CORRECTION

PATENT NO. : 5,525,220
DATED : June 11, 1996
INVENTOR(S) : Yagi, et al.

It is certified that error appears in the above-indentified patent and that said Letters Patent is hereby corrected as shown below:

Col. 12, line 39    After " ports " insert --,said modules being --

Signed and Sealed this

Tenth Day of December, 1996

Attest:

BRUCE LEHMAN

*Attesting Officer*   *Commissioner of Patents and Trademarks*